United States Patent [19]
Boynton et al.

[11] 4,171,710
[45] Oct. 23, 1979

[54] CLOSED PESTICIDE MIX SYSTEM

[76] Inventors: Edgar M. Boynton, 982 Gill Ave., Port Hueneme, Calif. 93041; William H. Roberts, 701 Arbor Ave., Ventura, both of Calif. 93003

[21] Appl. No.: 876,931

[22] Filed: Feb. 10, 1978

[51] Int. Cl.² .................................... F16K 19/00
[52] U.S. Cl. ................................... 137/238; 137/604; 141/91; 141/104
[58] Field of Search ............... 137/238, 604; 141/89, 141/91, 100, 104; 222/132, 136, 144.5, 145

[56] References Cited
U.S. PATENT DOCUMENTS

| | | | |
|---|---|---|---|
| 2,065,583 | 12/1936 | Heitzman | 137/604 X |
| 2,599,678 | 6/1952 | Walker | 137/604 X |
| 3,447,505 | 6/1969 | Wagner | 137/604 X |
| 4,092,993 | 6/1978 | Stevenson | 137/238 X |

*Primary Examiner*—Robert G. Nilson
*Attorney, Agent, or Firm*—Ralph B. Pastoriza

[57] ABSTRACT

A closed system is provided for simultaneously mixing pesticide with water and transferring the same to a storage or spray tank for subsequent use. The system includes a pipe casing having a water inlet section for connection to a pump and a water discharge section for connection to the spray tank with a venturi chamber defined therebetween. A sealed hose connects the venturi chamber to a pesticide shipping container so that when water is pumped into the spray tank, pesticide is drawn into the venturi chamber in a proper proportion for mixing with the water.

4 Claims, 3 Drawing Figures

CLOSED PESTICIDE MIX SYSTEM

This invention relates to pesticide spray solutions and more particularly to a closed mixing and transfer system for simultaneously mixing and transferring pesticide from a selected pesticide shipping container to a storage or spray tank in a tractor or aircraft.

BACKGROUND OF THE INVENTION

State laws impose stringent conditions in the handling of pesticide chemicals particularly when in concentrated form. Conventionally, the pesticide chemicals are provided in closed shipping containers from which the chemical is withdrawn and mixed with water for storage in a spray tank preparatory to a spraying operation. The storage or spray tank may be on a tractor or an aircraft.

It is essential in operations of the foregoing type that the mixing and transfer of the pesticide from the shipping container to the spray tank be carried out without exposing the operator to the concentrated materials. Further, it is desirable to provide some means for flushing out the shipping containers after the pesticide has been used up.

BRIEF DESCRIPTION OF THE PRESENT INVENTION

With the foregoing in mind, the present invention contemplates an improved closed pesticide mix system wherein a pesticide from a shipping container can be mixed in proper proportion with water and transferred to a storage or spray tank, all within a completely closed system to the end that an operator is not exposed to the dangerous chemical.

In many instances, it is desirable to mix different pesticides to provide particular spray solutions and towards this end, the present invention further contemplates a manifold for cooperation in the system enabling the switching from one pesticide shipping container to another without disturbing the closed system so that risk of operator exposure to chemicals in switching between one pesticide and another is minimized.

Briefly, the system includes a pipe casing having a water inlet section for connection to a water pump and a water discharge section for connection to a storage or spray tank, the pipe casing itself defining a venturi chamber between the inlet and discharge. A sealed pesticide hose or conduit connects between the venturi chamber and the pesticide shipping container, the generated vacuum in the venturi chamber drawing in a proper amount of pesticide for mixing with the water thereby simultaneously mixing and transferring the pesticide to the spray tank.

In a preferred embodiment of the invention the system further includes a manifold having a plurality of inlets sealingly connected to a plurality of different pesticide shipping containers respectively and a single outlet connecting in sealing relationship to the venturi in the pipe casing. A different pesticide can then be introduced without exposure by simply closing off one pesticide container and opening up another.

BRIEF DESCRIPTION OF THE DRAWINGS

A better understanding of this invention will be had by now referring to the accompanying drawings in which.

DETAILED DESCRIPTION OF THE INVENTION

Figure 1:
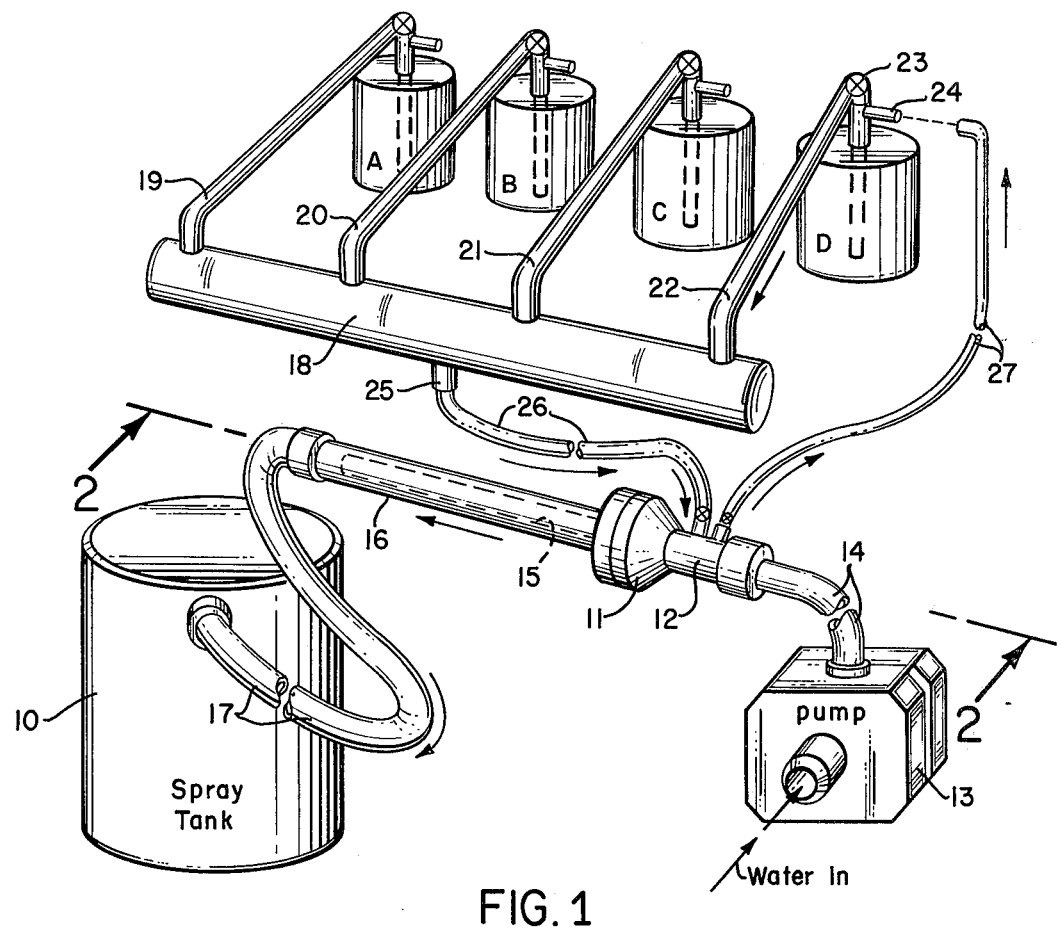
FIG. 1 is a perspective view of the closed pesticide mix system in operative condition for mixing and transferring pesticide from a selected pesticide shipping container to a spray tank.

Referring first to FIG. 1, there is shown in the lower left portion a spray or storage tank 10 for receiving a mixture of pesticide and water in proper proportion. Tank 10 may be on a tractor or may be incorporated in an aircraft, the mixed solution received therein being used for spray purposes.

Shown in the upper portion of FIG. 1 is a plurality of pesticide shipping containers labeled A, B, C and D. While only four such containers are shown, there may be provided additional containers. Each of the containers includes a particular type of pesticide.

The closed pesticide mix system of this invention is capable of mixing a chemical from a selected one of the pesticide shipping containers with fresh water in proper proportion and transferring the mixture to the spray tank 10.

Thus, as illustrated in the central portion of FIG. 1 the system includes a pipe casing 11 having a water inlet pipe section 12 for receiving fresh water from a pump 13 as by way of hose 14.

The pipe casing 11 further includes a discharge pipe section illustrated in phantom lines at 15 extending from the casing in axial alignment with the inlet pipe section 12. In the particular embodiment illustrated in FIG. 1, there is also shown an adapter pipe 16 of large inside diameter than the outside diameter of the discharge pipe section 15 coaxially surrounding the discharge pipe section. The end of the adapter pipe 16 is sealingly connected by hose 17 to the spray tank 10.

As will become clearer as the description proceeds, the pipe casing 11 in its interior defines a venturi chamber between the inlet pipe section 12 and discharge pipe section 15 for creating a vacuum and drawing in an appropriate proportion of pesticide for mixing with water from the water pump 13. Towards this end, there is provided a manifold 18 having a plurality of inlets 19, 20, 21 and 22 for sealed connection to the pesticide shipping containers A, B, C, and D respectively. Each of the shipping containers includes an open-close valve 23 and a small flush lateral pipe section 24 the purpose for which will be described subsequently. By opening the valve associated with a selected pesticide shipping container, only that particular chemical pesticide will be received in the manifold 18.

As shown in FIG. 1, manifold 18 includes a single outlet 25 connected by way of a conduit or hose 26 to the central portion of the pipe casing 11 to communicate with the venturi chamber therein.

The system of FIG. 1 is completed by the provision of a flush water line 27 laterally extending through an appropriate communication opening with the inlet pipe section 12 as shown. The extending end of the line 27 can be connected to any one of the lateral flushing pipe sections such as 24 associated with the shipping containers for flushing out the tank after the pesticide has been used up.

Figure 2:
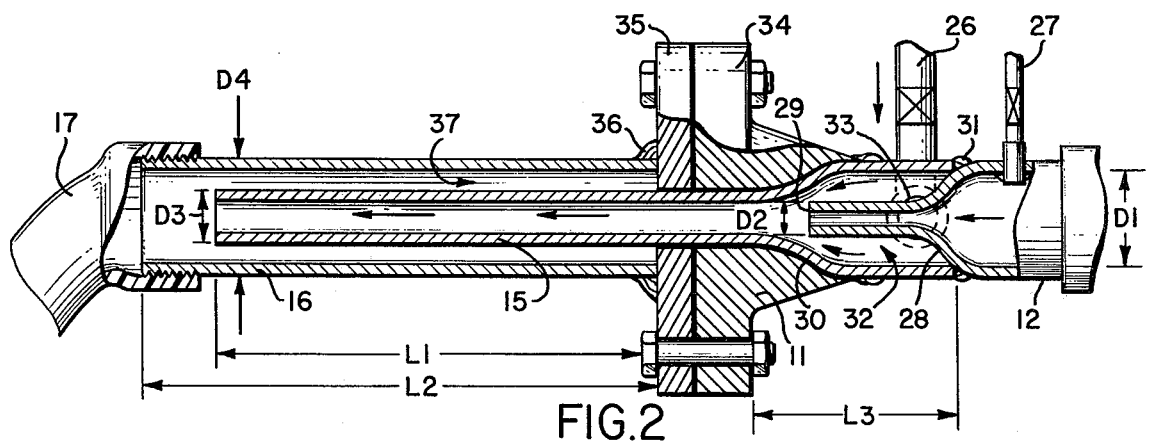
FIG. 2 is an enlarged view partly cut away and partly in cross section of a portion of the system looking in the direction of the arrows 2—2 of FIG. 1; and, FIG. 3 is a reduced fragmentary view partly in cross section illustrating an altered manner of utilizing the system in the filling of a spray tank.

Referring now to FIG. 2, details of the pipe casing construction together with the inlet pipe section and outlet pipe section will be evident. As shown, the inlet pipe section 12 narrows down in diameter as at 28 to terminate in a reduced diameter opening 29 in the pipe casing 11. The end portion of the discharge pipe section in the casing 11, in turn, flares outwardly as indicated at 30 to receive and surround the narrowed portion 28 of the inlet pipe section, this flared end of the discharge pipe section engaging in sealing relationship the periphery of the inlet pipe section at the point it starts to narrow as indicated at 31. Between the inside surface of the flared portion and the outside surface of the narrowed portion there is thus defined a venturi chamber 32. This venturi chamber 32 communicates with the conduit or hose 26 from the single outlet of the manifold through a lateral opening indicated at 33.

It will be noted in FIG. 2 that the lateral water outlet line 27 connects to the side of the inlet pipe section 12 upstream of the point where the pipe section begins to narrow thus providing a source of flushing water for the pesticide shipping containers after they have been emptied. Appropriate valves, indicated schematically, are, of course, provided.

Still referring to FIG. 2, it will be noted that the far end of the adapter pipe 16 extends beyond the end of the discharge pipe section 15 for a short distance, the hose 17 connected to this far end of the adapter pipe. In the particular embodiment of the pipe casing 11 illustrated, the same includes a radially outwardly extending flange 34. This flange cooperates with a similar outwardly extending flange 35 to which the adapter pipe 16 is welded as at 36 to support the adapter pipe in axial alignment with the discharge pipe section 15. When the adapter pipe is used as illustrated in FIG. 2, there is defined an annular space 37 between the exterior of the discharge pipe section 15 and interior of the adapter pipe 16.

In some applications, the pipe casing 11 may be secured directly to the side wall of a spray tank or storage tank and in such instance, the adapter pipe 16 need not be used. Thus, with reference to FIG. 3, the flange 34 can serve the purpose of securing the pipe casing 11 directly to the side wall 38 of a spray tank as shown, there being provided a side opening in the tank for receiving the discharge pipe section 15. A hose or further pipe section 39 forming a right angle turn connects to the end of the discharge pipe section 15 within the storage tank.

Referring back once again to FIG. 2, the nominal diameter of the inlet pipe section 12 is indicated at D1, the reduced diameter end thereof being indicated at D2. The diameter of the discharge pipe section 15 is indicated at D3 and the diameter of the adapter pipe section 16 at D4.

The length of the discharge pipe section 15 is indicated at L1 while the length of the adapter pipe section 16 is indicated at L2. Finally, the overall length of the venturi chamber and narrowed and flared portions of the inlet and discharge pipe sections defining the venturi is indicated at L3.

The dimensioning described in conjunction with the pump rate or rate that water is passed through the pipe casing are adjusted to provide a desired proportionate mixing of the pesticide with the water.

In a specific embodiment of the invention, the pipe casing and associated inlet and discharge pipe sections are formed of stainless steel and the dimensioning within plus or minus 0.5 cm is as follows:
D1 = 5 cm
D2 = 2 cm
D3 = 3 cm
D4 = 5 cm
L1 = 27 cm
L2 = 30 cm
L3 = 8 cm.

OPERATION

In operation, assume that the pesticide chemical in shipping container D in FIG. 1 is to be mixed with water and transferred to spray tank 10. In this event, the valve 23 is open on container D, the various valves on the remaining containers all being closed.

The pump 13 is started to pump water through the pipe casing 11 whereby a decrease in pressure is generated in the venturi chamber 32 described in FIG. 2 in response to water pumped through the inlet pipe section and exiting from the narrowed portion into the discharge pipe section. This decreased pressure will draw in pesticide from the shipping container D to mix with the water and be transferred to the spray tank 10 by way of the outlet hose 17.

Figure 3:
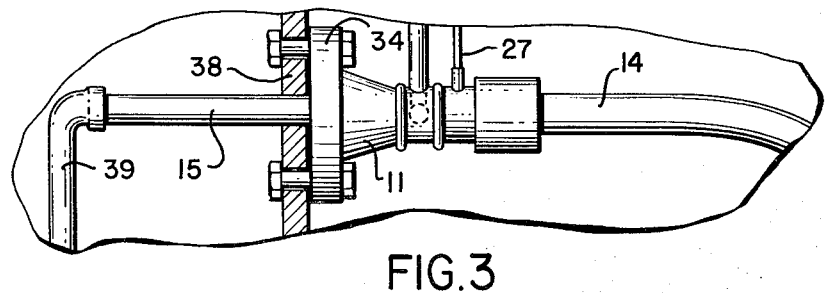

In the absence of the adapter pipe 16 in FIG. 2 and with a hose simply connected to the end of the discharge pipe section 15 such as illustrated in FIG. 3, the venturi creates a vacuum equivalent to 254 mm of mercury when the water flow rate is 150 liters per minute.

If the water flow rate is increased to 225 liters per minute, the vacuum increases to an equivalent of 510 mm of mercury. Under these latter conditions, when the adapter pipe section 16 is added as shown in FIGS. 1 and 2, for the same rate of flow of 225 liters per minute, the venturi vacuum becomes equivalent to 711 mm of mercury.

As described heretofore, the rate of flow and dimensioning of the portions making up the venturi chamber are such as to provide for a desired proportionate mix of the pesticide with the water.

When the pesticide container D is empty, it can readily be flushed out by means of the flush water line 27 connected to the inlet pipe section 12, the end of the discharge pipe section 15 being closed off and an appropriate valve in the line 27 being opened for this purpose.

As also mentioned heretofore, in some applications it might be desirable to secure the pipe casing directly to the side of a storage or spray tank and thereafter connect the various hoses 14, 26 and 27 for effecting the desired mixing and transfer. The flange structure 34 described in FIG. 2 serves for the purpose of securing the pipe casing directly to the side of a container, or, alternatively, supporting the adapter pipe 16 by way of its flange 35 in proper coaxial relationship with the discharge pipe section 15.

The entire system as described when in operation is completely closed so that there is no danger of operators being exposed to the chemicals in the pesticide containers.

We claim:

1. A closed pesticide mix system for filling a spray tank with a mixture of water and a pesticide selected from a plurality of available sealed pesticide shipping containers, said system including, in combination:

(a) a pipe casing having a water inlet pipe section for connection to a water pump and an elongated discharge pipe section extending from said casing in axial alignment with said inlet pipe section, said inlet pipe section narrowing down in diameter to terminate in a reduced diameter opening in said casing, the portion of said discharge pipe section in said casing flaring outwardly to receive and surround the narrowed end of said inlet pipe section, the flared end of said discharge pipe section engaging in sealing relationship with the periphery of the inlet pipe section at the point it starts to narrow to thereby define an annular venturi chamber between the inside surface of the flared portion and the outside surface of the narrowed portion;

(b) a manifold having a plurality of inlets for sealed connection to said pesticide shipping containers respectively and a single outlet;

(c) a sealed conduit connecting said single outlet in said manifold to said venturi chamber in said pipe casing;

(d) an adapter pipe of larger inside diameter than the outside diameter of said discharge pipe section coaxially surrounding said discharge pipe section, one end of said adapter pipe being connected to said pipe casing and its other end extending beyond the end of said discharge pipe section; and (e) a sealed hose connecting said other end of said adapter pipe to said spray tank, the dimensioning of said venturi chamber and water pump rate being adjusted such that a decrease in pressure is generated in said venturi chamber in response to water pumped through said inlet pipe section and exiting from said narrowed portion into said discharge pipe section to draw in a desired proportion of pesticide from a selected one of said shipping containers to mix with said water and pass into said spray tank.

2. A closed pesticide mix system for filling a spray tank with a mixture of water and a pesticide selected from a plurality of available sealed pesticide shipping containers said system including, in combination:

(a) a pipe casing having a water inlet pipe section for connection to a water pump and an elongated discharge pipe section extending from said casing in axial alignment with said inlet pipe section, said inlet pipe section narrowing down in diameter to terminate in a reduced diameter opening in said casing, the portion of said discharge pipe section in said casing flaring outwardly to receive and surround the narrowed end of said inlet pipe section, the flared end of said discharge pipe section engaging in sealing relationship with the periphery of the inlet pipe section at the point it starts to narrow to thereby define an annular venturi chamber between the inside surface of the flared portion and the outside surface of the narrowed portion;

(b) a manifold having a plurality of inlets for sealed connection to said pesticide shipping containers respectively, and a single outlet; and (c) a sealed conduit connecting said single outlet in said manifold to said venturi chamber in said pipe casing, the dimensioning of said venturi chamber and water pump rate being adjusted such that a decrease in pressure is generated in said venturi chamber in response to water pumped through said inlet pipe section and exiting from said narrowed portion into said discharge pipe section to draw in a desired proportion of pesticide from a selected one of said shipping containers to mix with said water and pass into said spray tank, said pipe casing including a lateral water outlet in one side of said inlet pipe section upstream of said point where said pipe section begins to narrow for providing a source of flushing water for said pesticide shipping containers after they have been emptied.

3. A closed pesticide mix system for filling a spray tank with a mixture of water and a pesticide selected from a plurality of available sealed pesticide shipping containers said system including, in combination:

(a) a pipe casing having a water inlet pipe section for connection to a water pump and an elongated discharge pipe section extending from said casing in axial alignment with said inlet pipe section, said inlet pipe section narrowing down in diameter to terminate in a reduced diameter opening in said casing, the portion of said discharge pipe section in said casing flaring outwardly to receive and surround the narrowed end of said inlet pipe section, the flared end of said discharge pipe section engaging in sealing relationship with the periphery of the inlet pipe section at the point it starts to narrow to thereby define an annular venturi chamber between the inside surface of the flared portion and the outside surface of the narrowed portion;

(b) a manifold having a plurality of inlets for sealed connection to said pesticide shipping containers respectively, and a single outlet; and (c) a sealed conduit connecting said single outlet in said manifold to said venturi chamber in said pipe casing, the dimensioning of said venturi chamber and water pump rate being adjusted such that a decrease in pressure is generated in said venturi chamber in response to water pumped through said inlet pipe section and exiting from said narrowed portion into said discharge pipe section to draw in a desired proportion of pesticide from a selected one of said shipping containers to mix with said water and pass into said spray tank, said pipe casing including an outwardly extending flange for securing the same directly to the wall of said spray tank.

4. A system according to claim 3, including an adapter pipe of larger inside diameter than the outside diameter of said discharge pipe section arranged to coaxially surround said discharge pipe section, one end of said adapter pipe terminating in an outwardly extending flange dimensioned to be secured to said outwardly extending flange on said pipe casing, the other end of said adapter pipe extending beyond the end of said discharge pipe section; and a sealed hose connecting said other end of said adapter pipe to said spray tank.

* * * * *